(12) United States Patent
Steffen

(10) Patent No.: US 6,285,925 B1
(45) Date of Patent: Sep. 4, 2001

(54) METHOD AND SAFETY DEVICE FOR THE REMOTE-CONTROL OF SELF-PROPELLING WORKING MACHINES

(75) Inventor: Michael Steffen, Stockdorf (DE)

(73) Assignee: Wacker-Werke GmbH & Co. KG, Munich (DE)

( * ) Notice: Subject to any disclaimer, the term of this patent is extended or adjusted under 35 U.S.C. 154(b) by 0 days.

(21) Appl. No.: 09/423,491

(22) PCT Filed: Sep. 30, 1998

(86) PCT No.: PCT/EP98/06206

§ 371 Date: Nov. 8, 1999

§ 102(e) Date: Nov. 8, 1999

(87) PCT Pub. No.: WO99/21153

PCT Pub. Date: Apr. 29, 1999

(30) Foreign Application Priority Data

Oct. 22, 1997 (DE) ................................. 197 46 700

(51) Int. Cl.⁷ ................ G05D 1/00; G06G 7/78; G01S 13/00; E21C 35/24
(52) U.S. Cl. .................. 701/2; 701/300; 701/301; 701/50; 701/24; 342/69; 299/30
(58) Field of Search ................... 701/300, 301, 701/50, 23, 24, 2; 382/69, 70, 72; 340/904; 299/30; 446/454, 456

(56) References Cited

U.S. PATENT DOCUMENTS 5,450,068 * 9/1995 Steffen .............................. 340/825.03
5,653,462 * 8/1997 Breed et al. .......................... 280/735

FOREIGN PATENT DOCUMENTS 42 21 793 C1    2/1994 (DE) .
196 00 791
   A1           7/1997 (DE) .
0 514 244 A1   11/1992 (EP) .

* cited by examiner

Primary Examiner—Jacques H. Louis-Jacques
Assistant Examiner—Brian J. Broadhead
(74) Attorney, Agent, or Firm—Boyle Fredrickson Newholm Stein & Gratz SC

(57) ABSTRACT

A soil compacting machine has a receiver unit that can receive control signals from a transmitter unit to a receiver unit. The transmitter unit can be operated by a user and is separate from the machine. The control signals are then processed into commands and sent to a control mechanism of the machine. Signals originating from the transmitter unit and reflected by the machine are received as safety signals by a receiver connected to the transmitter unit and are tested in relation to at least one distance-dependent parameter. If the parameter which is tested shows that a predetermined safety distance between the machine and the receiver is not respected, the transmission of the control signals or the operation of the machine is interrupted.

26 Claims, 1 Drawing Sheet

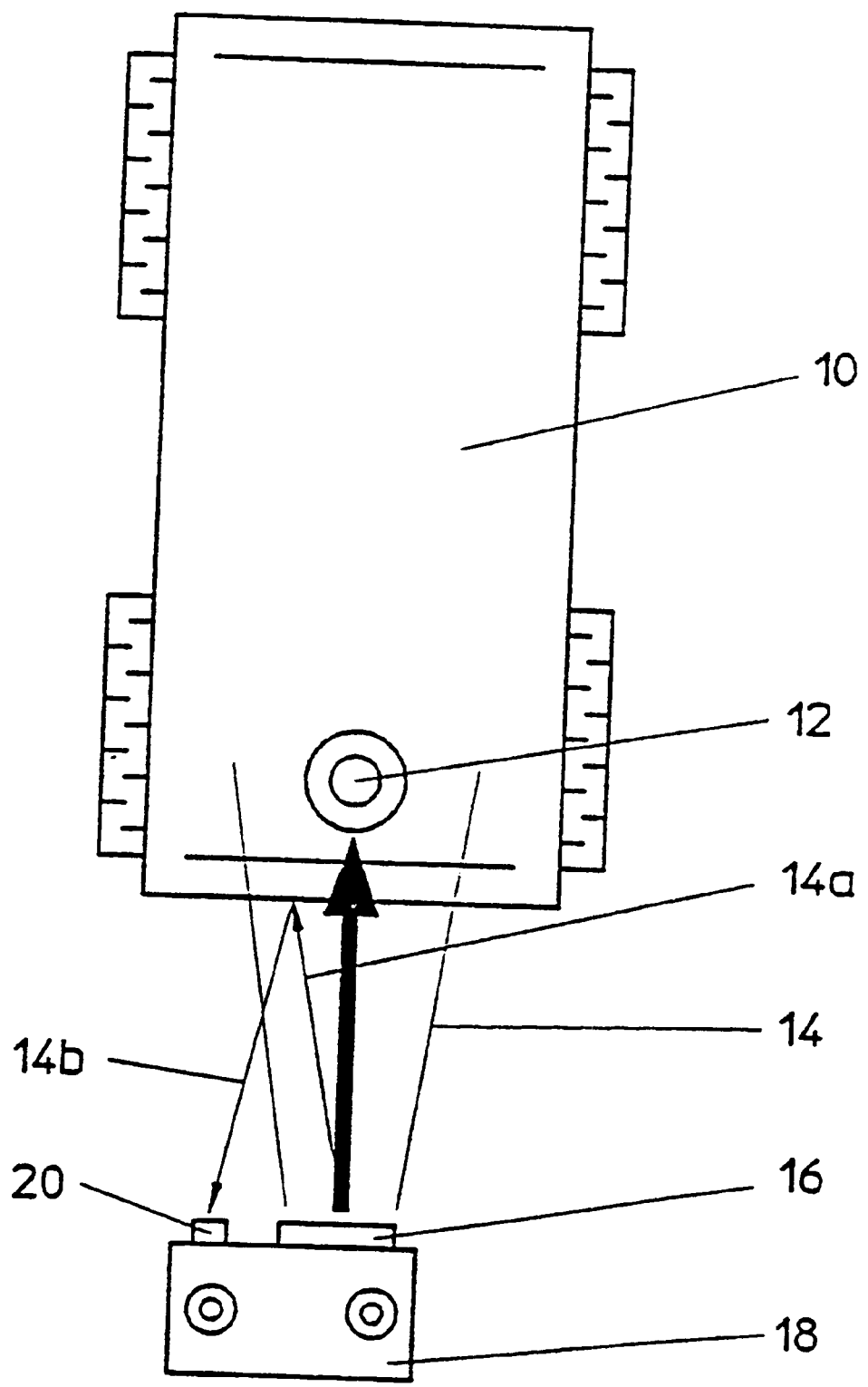

METHOD AND SAFETY DEVICE FOR THE REMOTE-CONTROL OF SELF-PROPELLING WORKING MACHINES

BACKGROUND OF THE INVENTION

1. Field of the Invention

The invention concerns a method according to the preamble of claim 1 and a safety device according to the preamble of claim 9.

2. Description of the Related Art

There is a known method for the remote control of self-propelling working machines, especially soil-compacting machines such as rollers, vibration plates or the like, in which control signals are sent by means of a transmitting unit, which can be operated by an operator and are separate from the working machine, to a receiving unit on the working machine and are processed by the receiving unit for generating an electrical control signal for controlling the working machine.

In the remote control of self-propelling working machines it must be ensured that an adequate safety distance is maintained between the operator and the working machine to rule out any danger to the operator from the running working machine. In the case of trench rollers there are legal regulations prescribing a minimum distance between the trench roller and the operator. If the distance is not respected, all potentially dangerous movements must be prevented, so that the trench roller must be immediately stopped.

DE 42 21 793 C1 discloses an infrared remote control for self-propelling soil-compacting machines which sends from a control device carried by the operator not only the infrared control radiation intended for the functional control of the working machine but also infrared near-range radiation at much lower intensity than the control radiation, so that this near-range radiation can be received with adequate intensity only in close proximity to the transmitter. When this near-range radiation is received, the generation of electric signals, which are caused by the control radiation and otherwise make the working machine move along, is suppressed in the receiving unit on the working machine.

Using this method, the working machine can be moved as long as a safety signal does not arrive with adequate intensity at the working machine. Attenuations of the signal intensity that are not based on a large distance between the transmitter and receiver required for safety reasons may lead to the working machine still being able to move even if the safety distance is no longer being respected. Such a source of error results from the fact that the receiving eye, for example on a trench roller, is usually not arranged centrally, with respect to the direction of propulsion, but at the intended place for the operator in the region of one of the end faces. This produces an unsymmetrical receiving field with respect to the trench roller, with the effect that, when the operator with the transmitter is in front of the end face of the machine away from the receiving eye, the actual safety distance between the operator and the machine is shortened by the distance which exists between this end face and the receiving eye, that is for example by 2 m in comparison with the safety distance when the operator is in front of the other end face of the machine. If the operator stands very close to the end face of the machine away from the receiving eye, this effect is intensified even further by the fact that the assumed 2 m of machine length that have to be bridged between the transmitter and the receiving eye can shield the radiation. While the weak safety signals cannot reach the receiving eye for the reasons mentioned, the strong control signals, which may be reflected by lateral trench walls, arrive at the receiving eye and, as a result, give the impression that there is an adequate safety distance.

If the receiving eye for the safety signal is located on the working machine, there is a tendency for it to become soiled, which may cause signal attenuation. This may also have the effect of giving the false impression of an adequate safety distance, even if the predetermined safety distance is no longer being respected.

DE 196 00 791 A1 discloses a remote control in which the distance of the remote control devices from a working machine is concluded from the signals sent by evaluating the phase or intensity of the signals, in order to avoid the overlapping of effective ranges of different remote controls. The purpose of this arrangement is to limit as accurately as possible the range of each radio control transmitter to a fixed working range, in order to avoid any danger to personnel in the working and effective range of the radio-remote-controlled equipment.

OBJECTS AND SUMMARY OF THE INVENTION

The invention is based on the object of designing the method stated at the beginning in such a way that a more reliable safety signal is available. The invention is also based on the object of specifying a suitable safety device.

The solution achieving the object according to the defining part of claim 1 is that signals coming from the transmitting unit and reflected by the working machine are picked up as safety signals by a receiver connected to the transmitting unit, at least one distance-dependent parameter of the safety signals picked up by the receiver is checked and the operation of the working machine is interrupted if the checked parameter indicates that a predetermined safety distance between the working machine and the receiver is not being respected.

Since in the case of the method according to the invention the distance is measured between the transmitting and receiving unit for the safety signal, carried by the operator, and the side of the working machine immediately opposite the transmitter and reflecting the safety signal, the source of errors caused by an unsymmetrical arrangement of the receiving eye on the working machine is eliminated. Since no signal processing but only a reflection takes place on the working machine with respect to the safety signal, the risk of signal attenuation due to a soiled receiving eye is greatly reduced, because on the one hand the risk of soiling is much less for the receiving eye remote from the working machine on the transmitting unit and on the other hand it is possible for this receiving eye to be cleaned at any time without having to relinquish the safety distance between the operator and the working machine.

The operation of the working machine is advantageously interrupted by sending a stop signal from the transmitting unit or by interrupting the sending of the control signals.

A simple embodiment consists in that the control signals reflected by the working machine are checked by the receiver connected to the transmitting unit. In the case of a preferred refinement, safety signals separate from the control signals are sent by the transmitting device and, after reflection at the working machine, are checked by the receiver connected to the transmitting unit. In this case, the safety signals can be sent as electromagnetic radiation or else be transmitted in the infrared frequency range, it then being possible to check the intensity of the safety signals to establish that the safety distance is being maintained.

However, the safety signals may also be sent as acoustic signals in the ultrasonic range, the transit time of the safety signals between the transmitter and receiver being checked at the transmitting unit.

The invention also relates to a safety device for remote-controlled, self-propelling working machines for carrying out the method according to the invention with a control device which is to be carried by an operator and comprises a transmitter for sending control signals to a receiver arranged on the working machine and connected to the control of the latter, it being provided according to the invention that the control device is connected to a receiver for signals coming from the control device and reflected by the working machine, to which device there is assigned a testing circuit for checking at least one parameter of the received, reflected signals that is dependent on the distance between the reflecting surface of the working machine and the receiver, which circuit is suitable for interrupting the operation of the working machine if a predetermined test condition occurs. For interrupting the operation of the working machine, the sending of the control signals can be interrupted or a stop signal can be sent.

In this case, the control device preferably comprises not only a transmitter for control signals but also a transmitter for safety signals, and the receiver of the control device is tuned to the safety signals.

In this case, the transmitter for safety signals may be an infrared transmitter or else an ultrasonic transmitter.

BRIEF DESCRIPTION OF THE DRAWING

The invention is explained in more detail on the basis of the description now following of an exemplary embodiment thereof, represented in the single FIGURE.

The FIGURE shows in a schematic plan view a working machine in the form of a trench roller and an assigned infrared hand-held transmitter as the control device.

DETAILED DESCRIPTION OF THE PREFERRED EMBODIMENTS

At one end of a self-propelling trench roller 10, which can be remote-controlled by means of infrared beams, there is a receiving eye 12 for the infrared control beams 14, which emerge in a directed manner from a transmitting eye 16 of a portable control device 18, which is carried by an operator. Control commands entered in the control device by the operator are transmitted to a controller of the trench roller 10 by means of these control beams 14.

The arriving radiation is reflected by the outside wall of the trench roller 10, as is shown by the example of the transmission beam 14a and the reflected beam 14b. As a result, the reflected radiation passes to a reflex receiver 20, provided on the control device 18. The beams arriving at this reflex receiver 20 are checked by a testing circuit (not shown), accommodated in the control device 18, in order to establish on the basis of at least one preselected parameter and a limit value assigned to it whether the control device is inside or outside a safety zone surrounding the trench roller. If the limit value is exceeded, the trench roller is stopped, which can take place for example by preventing the sending of control commands or by sending a stop signal.

The reflex receiver 20 may be tuned to the control signals coming from the transmitting eye 16. However, separate safety signals may also be sent in the infrared range, to which the reflex receiver 20 is tuned. In this case, commercially available so-called "light scanners" may be used. It is consequently possible, for example, to use an RF radiation for the transmission of the control commands.

In the case of infrared safety signals, the intensity of the reflected infrared radiation may be evaluated as a parameter for the distance between the control device and the trench roller. However, ultrasonic signals may also be sent as safety signals, it then being possible for the transit time of the signals to be used as a parameter.

What is claimed is:

1. A method for the remote control of a self-propelling soil-compacting machine, comprising:

sending control signals via a transmitting unit, which can be operated by an operator and which is separate from the machine, to a receiving unit on the machine;

processing the control signals received by the receiving unit to form control commands to be issued to a controller of the machine, wherein signals coming from the transmitting unit and reflected by the machine are picked up as safety signals by a receiver connected to the transmitting unit;

checking at least one distance-dependent parameter of the safety signals picked up by the receiver; and interrupting the operation of the machine if the checked parameter indicates that a predetermined safety distance between the machine and the receiver is not being respected.

2. The method as claimed in claim 1, wherein the operation of the machine is interrupted by sending a stop signal from the transmitting unit or by interrupting the sending of the control signals.

3. The method as claimed in claim 1, wherein the control signals reflected by the machine are checked by the receiver.

4. The method as claimed in claim 1, wherein safety signals separate from the control signals are sent by the transmitting unit and, after reflection at the machine, are checked by the receiver.

5. The method as claimed in claim 4, wherein the safety signals are sent as electromagnetic radiation or in the infrared frequency range.

6. The method as claimed in claim 5, wherein the intensity of the safety signals is checked.

7. The method as claimed in claim 4, wherein the safety signals are sent as acoustic signals in the ultrasonic range.

8. The method as claimed in claim 7, wherein the transit time of the safety signals is checked.

9. A safety device for a remote-controlled, self-propelling working machine for carrying out the method as claimed in claim 1, said safety device comprising: a control device which can be carried by an operator, and which comprises a transmitting unit and a receiver, wherein the transmitting unit is configured to send control signals to a receiving unit on the working machine and is connected to a controller of the working machine, wherein the receiver is configured to receive signals coming from the transmitting unit and reflected by the working machine, to which control device there is assigned a testing circuit for checking at least one parameter of the received, reflected signals that is dependent on the distance between the working machine and the receiver, the testing circuit being suitable for interrupting the operation of the working machine if a predetermined test condition occurs.

10. The safety device as claimed in claim 9, wherein, for interrupting the operation of the working machine, the sending of the control signals can be interrupted or a stop signal can be sent from the transmitting unit.

11. The safety device as claimed in claim 9, wherein the transmitting unit has a transmitter for control signals and a transmitter for safety signals, and wherein the receiver assigned to the transmitting unit is tuned to the safety signals.

12. The safety device as claimed in claim 11, wherein the transmitter for safety signals is an infrared transmitter and the testing circuit is suitable for determining the intensity of the received, reflected signals.

13. The safety device as claimed in claim 11, wherein the transmitter for safety signals is an ultrasonic transmitter and the testing circuit is suitable for determining the transit time of the received, reflected signals.

14. A method for the remote control of self-propelling working machines, comprising:
   (A) sending control signals from a transmitting unit, which can be operated by an operator and which is separate from the working machine, to a receiving unit on the working machine;
   (B) processing the control signals received by the receiving unit to form control commands to be issued to a controller of the working machine, wherein signals coming from the transmitting unit and reflected by the working machine are picked up as safety signals by a receiver that is connected to the transmitting unit; and
   (C) checking at least one distance-dependent parameter of the safety signals picked up by the receiver; and
   (D) automatically interrupting the operation of the working machine if the checked parameter indicates that a predetermined safety distance between the working machine and the receiver is not being respected.

15. A method as defined in claim 14, wherein the operation of the working machine is interrupted by sending a stop signal from the transmitting unit or by interrupting the sending of the control signals.

16. A method as defined in claim 14, wherein the control signals reflected by the working machine are checked by the receiver connected to the transmitting unit.

17. A method as defined in claim 14, wherein safety signals separate from the control signals are sent by the transmitting unit and, after reflection at the working machine, are checked by the receiver connected to the transmitting unit.

18. A method as defined in claim 17, wherein the safety signals are sent as electromagnetic radiation or in the infrared frequency range.

19. A method as defined in claim 18, wherein the intensity of the safety signals is checked.

20. A method as defined in claim 17, wherein the safety signals are sent as acoustic signals in the ultrasonic range.

21. A method as defined in claim 20, wherein the transit time of the safety signals is checked.

22. A safety device for remote-controlled, self-propelling working machines comprising:
   (A) a first receiver disposed on the working machine, the first receiver being coupled to a controller for the working machine;
   (B) a control device which is configured to be carried by an operator;
   (C) a transmitter which is located on the control device and which is configured to send control signals to the first receiver; and
   (D) a second receiver which is located on the control device and which is configured to receive signals sent from the transmitter and reflected by the working machine,
   wherein the control device includes a testing circuit for checking at least one parameter of the received, reflected signals that is dependent on the distance between the working machine and the second receiver, the testing circuit being configured to interrupt the operation of the working machine if a predetermined test condition occurs.

23. A safety device as defined in claim 22, wherein, for the interruption of the operation of the working machine, the sending of the control signals by the transmitter can be interrupted or a stop signal can be sent from the control device.

24. A safety device as defined in claim 22, wherein the control device further comprises a transmitter for safety signals, and wherein the second receiver is tuned to the safety signals.

25. A safety device as defined in claim 24, wherein the transmitter for safety signals is an infrared transmitter, and wherein the testing circuit is configured to determine the intensity of the received, reflected signals.

26. A safety device as defined in claim 24, wherein the transmitter for safety signals is an ultrasonic transmitter, and wherein the testing circuit is configured to determine the transit time of the received, reflected signals.

* * * * *